US006234430B1

(12) United States Patent
Turner, Sr.

(10) Patent No.: US 6,234,430 B1
(45) Date of Patent: May 22, 2001

(54) TOOL FOR HOLDING A WALLPAPER BORDER ROLL

(75) Inventor: Milton Turner, Sr., Palmetto, GA (US)

(73) Assignee: John L. James, Marietta, GA (US); a part interest ( * ) Notice: Subject to any disclaimer, the term of this patent is extended or adjusted under 35 U.S.C. 154(b) by 0 days.

(21) Appl. No.: 09/378,950

(22) Filed: Aug. 23, 1999

(51) Int. Cl.[7] .............................. A47F 5/00; B32B 31/00

(52) U.S. Cl. .................................. 248/125.8; 248/125.1; 248/309.2; 156/577

(58) Field of Search ................................ 248/125.1, 688, 248/519, 523, 125.8, 161, 162.1, 309.2, 309.1, 404, 411, 159, 157, 163.1, 440, 354.1; 242/423.2; 156/574, 577

(56) References Cited

U.S. PATENT DOCUMENTS

| | | | | |
|---|---|---|---|---|
| 2,273,813 | * | 2/1942 | Barber | 248/124.2 |
| 3,018,898 | * | 1/1962 | Frazelle | 211/107 |
| 3,391,889 | * | 7/1968 | Stewart, Jr. | 248/230.5 |
| 3,820,694 | * | 6/1974 | Pabis | 223/66 |
| 4,101,036 | * | 7/1978 | Craig | 211/107 |
| 4,102,513 | * | 7/1978 | Guard | 242/423.1 |
| 4,166,589 | * | 9/1979 | Hoover et al. | 242/423.1 |
| 4,711,682 | | 12/1987 | Barbe et al. | 156/574 |
| 5,042,221 | | 8/1991 | Pacione | 52/749 |
| 5,125,609 | | 6/1992 | Demeo | 248/216.1 |
| 5,280,869 | | 1/1994 | Ricci | 248/309.2 |
| 5,328,543 | | 7/1994 | Campagna | 156/574 |
| 5,403,432 | | 4/1995 | Burch | 156/577 |
| 5,453,152 | * | 9/1995 | Mazzola et al. | 156/577 |
| 5,478,432 | * | 12/1995 | Vester | 156/574 |
| 5,573,630 | * | 11/1996 | Edney et al. | 156/577 |
| 5,580,020 | * | 12/1996 | Catchings | 248/311.2 |
| 5,743,485 | * | 4/1998 | Martorelli et al. | 242/597.7 |
| 5,775,633 | | 7/1998 | Zane | 242/599.1 |
| 5,823,496 | * | 10/1998 | Foley et al. | 248/314 |
| 5,824,363 | | 10/1998 | Poole et al. | 427/207.1 |

* cited by examiner

*Primary Examiner*—Anita M. King
(74) *Attorney, Agent, or Firm*—James L. James

(57) ABSTRACT

A tool functions as a third hand to supporting a wallpaper border roll at a working height while the wallpaper border roll is unrolled and applied to a wall. The tool has a pole and a tensioning device that lodges the pole against the ceiling. A holder attached to the pole holds the border roll at the application height. As the paper hanger advances along the wall the tool is moved also while maintaining the border roll at the application height. The tensioning device has spring loaded legs that spread apart when the pole is pushed down to dislodge the pole from the ceiling to move the tool along and advance the border. When the pole is released, the spring draws the legs together again lodging the pole against the ceiling.

8 Claims, 1 Drawing Sheet

TOOL FOR HOLDING A WALLPAPER BORDER ROLL

FIELD OF THE INVENTION

The present invention relates to generally to a wallpaper border tool, and, more particularly, to a tool for holding up a wallpaper border roll as it is applied to a wall to prevent the applied border from coming undone as the paper hanger changes position to cover another section of the wall.

BACKGROUND OF THE INVENTION

Difficulty arises when hanging a wallpaper border because a portion of the border is usually inadvertently removed as the ladder is moved along the wall. A paper hanger typically applies the border to a section of a wall and steps down off the ladder to move the ladder along. When the paper hanger steps down, the border roll is lowered because the border roll is held in the hand or laid on the ladder. Lowering the border roll often causes a portion of the applied border to pull away from the wall. Accordingly, it will be appreciated that it would be highly desirable to have a tool to aid in applying a border that prevents a portion of the applied border from coming undone as the ladder is moved.

SUMMARY OF THE INVENTION

Briefly summarized, according to one aspect of the present invention, an apparatus for supporting a wallpaper border roll at a working height while the wallpaper border roll is unrolled and applied to a wall that extends between a floor and a ceiling comprises a pole, a holder attached to the pole and a tensioning device attached to the pole. The holder has a base member and a protruding member extending from the base member with the wallpaper border roll being received on the base with the protruding member extending axially thorough the wallpaper border roll. The holder is adjustably attached to the pole to vertically position the wallpaper border roll along the wall. The tensioning device is attached to the pole for tensioning the pole and causing the pole to remain erect and lodged between the floor and ceiling without intervention and causing the pole to dislodge to advance the wallpaper border along the wall with intervention. Intervention is accomplished by a paper hanger who pushes down on the pole to dislodge the pole to move the pole along the wall. When the downward force is released, the pole again lodges itself between the floor and ceiling.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
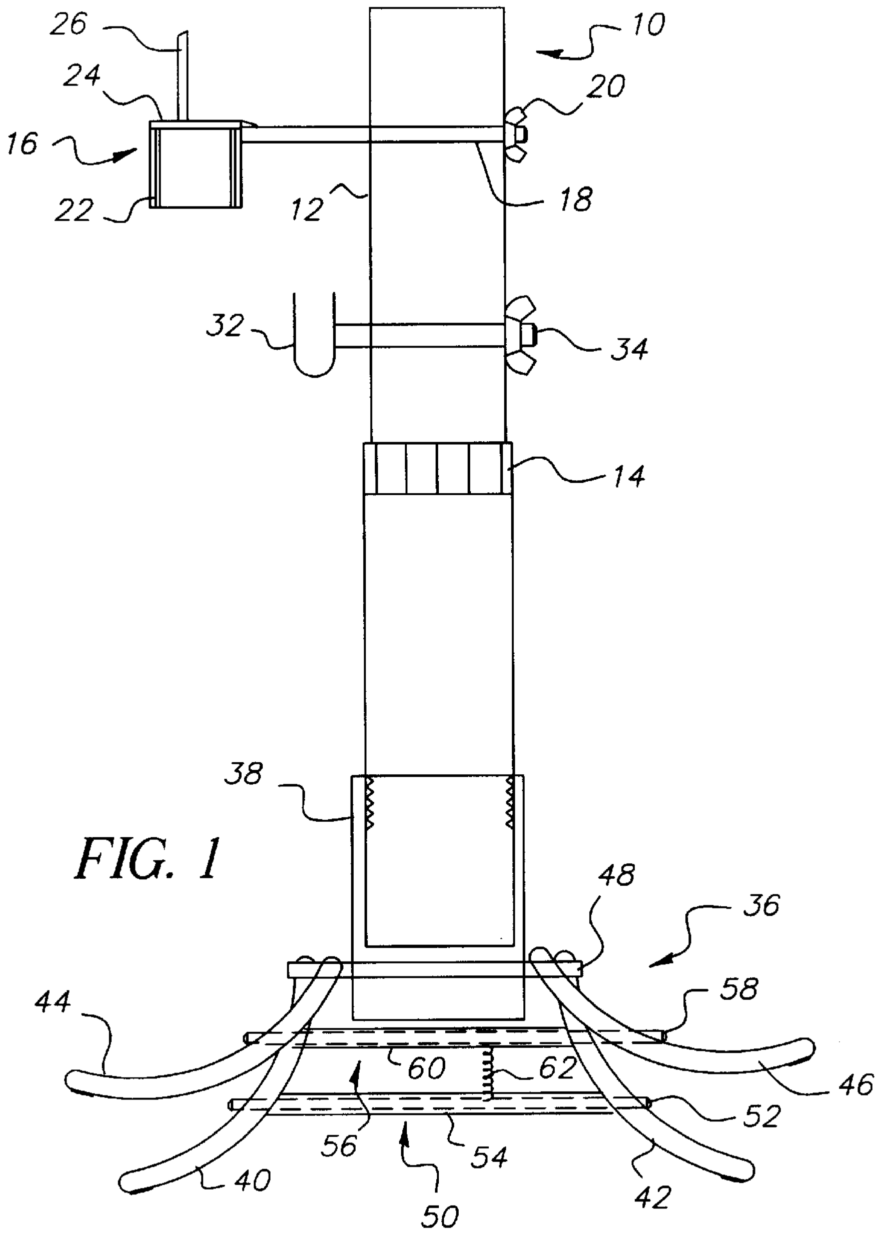
FIG. 1 is a diagrammatic plan view of a preferred embodiment of a walking wallpaper border roll holder according to the present invention.

Referring to FIG. 1, an apparatus 10 functions as a third hand to assist a paper hanger when hanging a wallpaper border. The apparatus 10 includes a pole 12, preferably a telescoping pole which has a bottom section and a top section with one section fitting inside the other section to adjust the length of the pole for a particular wall height. An adjusting knob 14 is loosened to adjust the pole length or height and tightened again to fix the positions of the top and bottom sections. Alternatively, a single piece pole could be used with a different length pole used to accommodate different wall heights.

Figure 2:
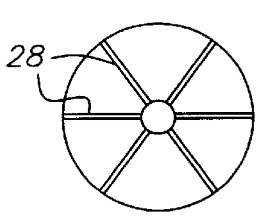
FIG. 2 is a view of the base member of the border roll holder of FIG. 1 illustrating drain grooves.
Figure 3:
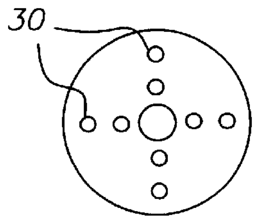
FIG. 3 is a view of the base member of the border roll holder of FIG. 1 illustrating drain holes.

A holder 16 is movably attached to the upper section of the pole 12 by a clamp 18 or the like. Clamp 18 may be spring loaded or may be secured in position on the pole with a wing nut 20 or other releasable fastener. Holder 16 includes a drip cup 22 for collecting drippings from the moistened wallpaper border roll, a platform 24 on which the border roll sits, and a spike 26 which fits in the central axial opening of the border roll. Platform 24 may have drain grooves 28 (FIG. 2) or may have drain openings 30 (FIG. 3) to remove the border drippings from the cup. Platform 24 may rest on legs 40 in cup 22 as illustrated, or may be fastened to cup 22 or clamp 18.

A tool cup 32 is attached to the pole with a clamp 34 below holder 16. Scissors or other tools may be conveniently placed tool cup 32 for use when hanging the wallpaper border. Alternatively, the pole could be constructed of magnetic material or contain a magnet for holding scissors or other tools.

A tensioning means 36 is attached to the bottom of the lower portion of the pole 12 for tensioning the pole causing the pole to remain erect and lodged between the floor and ceiling without intervention from the paper hanger and causing the pole to dislodge to advance the wallpaper border along the wall with intervention from the paper hanger. Tensioning means 36 includes a hub 38 that is releasably attached about the pole preferably using threaded members, thumbscrews or other hand operated fastening device so that adjustments can be made without tools. There are four legs 40, 42, 44, 46 arranged in two pairs with legs 40 and 42 forming one pair and legs 44 and 46 forming the other pair. All four legs are pivotally connected to hub 38. As illustrated, a bolt 48 extends through openings in the hub and legs creating a common pivot point for all four legs. Alternatively, attaching pins could protrude from hub 38 for attaching the legs with leg 40 and 44 attached to one pin on one side of the hub and legs 42 and 46 connected to the other side of the hub directly opposite legs 40 and 42. Also, bolt 48 could extend through the bottom of the pole where the bottom of the pole will not be changed to accommodate different wall heights. As illustrated, the legs are curved to accommodate slight unevenness in the floor but may be vertical legs where the floor is smooth and level.

Legs 40 and 42 are connected to one another by a cross-brace 50 attached to each leg. The cross-brace illustrated consists of a bolt 52 passing completely through both legs and a spacer 54 positioned between the legs with bolt 52 passing through it also. Cross-brace 52 maintains separation between the legs, keeps the legs from spreading and helps them pivot together as a unit. Similarly, legs 42 and 44 are connected to one another by a cross-brace 56 attached to each leg. The cross-brace illustrated consists of a bolt 58 passing completely through both legs and a spacer 60 positioned between the legs with bolt 58 passing through it.

A coil spring 62 is attached to cross-braces 52, 56 and urges the first and second pairs of legs toward one another. A downward force on the pole or hub forces the first and second pairs of legs apart against the force of the coil spring causing the height of the hub from the floor to lessen, and causing the top most end of the pole to disengage from the ceiling.

In operation the apparatus functions as a third hand which holds the wallpaper border roll at or near the height at which the border is applied leaving both hands free to apply and smooth the border. If the paper hanger uses a scaffold, then either the apparatus is positioned between the scaffold and the wall or the scaffold is positioned between the apparatus and the wall so that the apparatus can be moved along the wall as the paper hanger advances along the scaffold. The apparatus is moved along by pushing downward on the pole causing the legs to pivot and spread apart thereby lowering the pole a small amount sufficient to dislodge the pole from the ceiling. While dislodged from the ceiling, the apparatus can slide along the floor. If the floor is rough or otherwise uneven, the pole can be pushed farther downward creating more clearance with the ceiling and then lifted upward to clear the rough spots in the floor. In essence, the apparatus can be made to walk along the floor. While traversing the floor, the apparatus generally maintains the border roll at the application height so that the applied border does not come undone. At the desired location, the paper hanger releases the pole allowing the coil spring to pull the pairs of legs together thereby lodging the top of the pole against the ceiling.

While the invention has been described with particular reference to the preferred embodiments, it will be understood by those skilled in the art that various changes may be made and equivalents may be substituted for elements of the preferred embodiments without departing from invention. For example, the legs may have contact pads to make movement on certain floor surface easier.

As is evident from the foregoing description, certain aspects of the invention are not limited to the particular details of the examples illustrated, and it is therefore contemplated that other modifications and applications will occur to those skilled in the art. For example, while an adjustable telescoping pole has been described, a single piece pole can be used. A one-piece pole can be sized to match the wall height so that a seven-foot wall would used a pole slight less than seven feet to allow for the tensioning mechanism. It is accordingly intended that the claims shall cover all such modifications and applications as do not depart from the true spirit and scope of the invention.

What is claimed is:

1. An apparatus for supporting a wallpaper border roll at a working height while said wallpaper border roll is unrolled and applied to a wall that extends between a floor and a ceiling, said apparatus comprising:

a holder having a base member and a protruding member extending from said base member for receiving the wallpaper border roll on said base with said protruding member extending axially through the wallpaper border roll;

a pole;

attaching means for adjustably attaching said holder to said pole for vertically positioning the wallpaper border roll along the wall; and tensioning means, attached to said pole, for tensioning said pole causing said pole to remain erect, said tensioning means lodging said pole between the floor and ceiling without intervention and dislodging said pole for advancing the wallpaper border along the wall with intervention, said tensioning means including:

a hub attached about said pole;

a first pair of legs having each leg pivotally connected to said hub;

a first crossbrace connecting each leg of said first pair of legs;

a second pair of legs having each leg pivotally connected to said hub;

a second crossbrace connecting each leg of said second pair of legs; and a coil spring attached to said first and second crossbraces whereby a downward force on said hub forces said first and second pairs of legs apart against the force of said coil spring causing the height of said hub from said floor to lessen.

2. An apparatus, as set forth in claim 1, wherein said first and second pairs of legs pivot about a common pivot point.

3. An apparatus, as set forth in claim 1, wherein said pole is a telescoping pole.

4. An apparatus, as set forth in claim 1, including a cup attached to said pole for holding a wallpaper border tool.

5. An apparatus, as set forth in claim 1, wherein said holder includes a cup positioned under said base member.

6. An apparatus, as set forth in claim 5, wherein said base member has a groove for draining liquid from said wallpaper border roll into said cup.

7. An apparatus, as set forth in claim 5, wherein said base member has at least one opening for draining liquid from said wallpaper border roll into said cup.

8. An apparatus for supporting a wallpaper border roll at a working height while said wallpaper border roll is unrolled and applied to a wall that extends between a floor and a ceiling, said apparatus comprising:

a holder having a base member, a cup positioned under said base member and a protruding member extending from said base member for receiving the wallpaper border roll on said base with said protruding member extending axially through the wallpaper border roll, said base member having a groove for draining liquid from the wallpaper border roll into said cup;

a pole;

attaching means for adjustably attaching said holder to said pole for vertically positioning the wallpaper border roll along the wall; and tensioning means, attached to said pole, for tensioning said pole causing said pole to remain erect, said tensioning means lodging said pole between the floor and ceiling without intervention and dislodging said pole for advancing the wallpaper border along the wall with intervention.

* * * * *